(12) United States Patent
Rosenberg et al.

(10) Patent No.: US 6,306,333 B1
(45) Date of Patent: Oct. 23, 2001

(54) PROCESS FOR MAKING CELLULOSE ETHERS HAVING REDUCED YELLOWING AND DISCOLORATION

(75) Inventors: Steven Rosenberg; Michael V. Spencer; Gary J. Schulz, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/416,783

(22) Filed: Oct. 13, 1999

Related U.S. Application Data

(60) Provisional application No. 60/141,046, filed on Jun. 24, 1999.

(51) Int. Cl.[7] ............................ B29C 41/14; C08B 11/00; C08B 11/193
(52) U.S. Cl. ........................................ 264/297.1; 264/301
(58) Field of Search .................................. 264/297.1, 301

(56) References Cited

U.S. PATENT DOCUMENTS

| | | |
|---|---|---|
| 3,391,135 | 7/1968 | Ouno et al. |
| 4,048,433 | 9/1977 | Burns, et al. ........................... 536/99 |
| 4,061,859 | * 12/1977 | Cheng ..................................... 536/88 |

FOREIGN PATENT DOCUMENTS

| | | |
|---|---|---|
| 0 210 917 | 2/1987 | (EP) . |
| WO 98/27151 | 6/1998 | (WO) . |

OTHER PUBLICATIONS

Abstract of Japan 62–25101 (Feb. 3, 1987).

* cited by examiner

*Primary Examiner*—Leo B. Tentoni

(57) ABSTRACT

A process for making a low molecular weight cellulose ether has the following steps: a) providing a high molecular weight cellulose ether; b) contacting it with acid to partially depolymerize it to a cellulose ether of a viscosity of about 100 cP or less; c) neutralizing the acid; d) repeating steps a)–c) to produce two or more discrete product batches of low molecular weight cellulose ether and produce at least one discrete product batch which is partially neutralized; and e) blending the two or more discrete product batches to form a combined product batch of low molecular weight cellulose ether of a pH of 4 to 6.8. The process provides a cellulose ether with reduced yellowing and discoloration.

6 Claims, No Drawings

PROCESS FOR MAKING CELLULOSE ETHERS HAVING REDUCED YELLOWING AND DISCOLORATION

CROSS-REFERENCE TO RELATED APPLICATION

This application claims the benefit of U.S. Provisional Application No. 60/141,046, filed Jun. 24, 1999.

FIELD OF THE INVENTION

The present invention relates to an improved process for making low molecular weight cellulose ethers. The process employs partial neutralization of acid following an acid-catalyzed depolymerization step.

BACKGROUND OF THE INVENTION

Low molecular weight cellulose ethers are commonly employed commercially in pharmaceutical and food. Preferred cellulose ethers for such applications are methylcellulose and hydroxypropylmethylcellulose.

A problem frequently observed in low molecular cellulose ether is yellowing or discoloration. Such yellowing or discoloration can be observed in products into which the compositions are formulated. Yellowing or discoloration is easily observed in transparent pharmaceutical capsules and light-colored food compositions.

It would be desirable to have a process for manufacturing low molecular weight cellulose ethers wherein yellowing or discoloration is reduced or diminished. It would be desirable to reduce or diminish yellowing or discoloration in pharmaceutical capsules and food compositions.

SUMMARY OF THE INVENTION

According to the present invention, there is a process for making a low molecular weight cellulose ether. The process comprises the following: a) providing a high molecular weight cellulose ether of a viscosity of about 200 centipoise or more in a two percent aqueous solution at 20° C.; b) contacting the high molecular weight cellulose ether with an amount of an acid sufficient to partially depolymerize it to a low molecular weight cellulose ether of a viscosity of about 100 cP or less at 20° C. in a two percent aqueous solution; c) partially or substantially neutralizing the acid by contacting the low molecular weight cellulose ether with a basic compound; d) repeating steps a)–c) to produce two or more discrete product batches of low molecular weight cellulose ether; and e) blending the two or more discrete product batches to form a combined product batch of low molecular weight cellulose ether of a pH of 4 to 6.8.

Further according to the present invention, there is a process for making pharmaceutical capsules. The combined product batch of low molecular weight cellulose ether referenced above is dissolved in water to form a dip coating solution. Metal pins are dipped into the coating solution. The solution is allowed to thermally gel and subsequently dry on the pins to form thin films of dried cellulose ether composition around the pins. The thin films take the form of caps and/or bodies of two-piece hard shell capsules which are then removed from the pins. The caps and/or bodies can subsequently be mated to form whole capsules. Both hot pin/cold solution and cold pin/hot solution processes are possible.

DETAILED DESCRIPTION

In the present invention, it was discovered that control of acid content of a low molecular weight cellulose ether to certain pH levels significantly reduced yellowing and discoloration in the end product. Acidic pH is maintained by retaining a portion of the catalyzing acid following an acid-catalyzed depolymerization step in the manufacture of the low molecular weight cellulose ether. An observed problem of effective pH control in the end product low molecular weight cellulose ether is addressed by blending of two or more discrete product batches to form a combined batch.

In conventional manufacturing processes for making low molecular weight cellulose ethers, a higher molecular weight cellulose ether is depolymerized to the lower molecular weight cellulose ether by acid-catalyzed hydrolysis, usually by exposure to a strong inorganic acid such as hydrogen chloride or hydrochloric acid. After the desired degree of depolymerization is achieved, hydrolysis is halted by neutralization of the acid with an alkaline or basic compound such as sodium bicarbonate. The cellulose ether is typically neutralized to a neutral pH of about 7.

In the present invention, some degree of acidity is retained in the end product cellulose ether by neutralizing only a portion of the catalyzing acid. Physical and chemical stability problems in the end product associated with substantial retention of acid content, such as continued depolymerization, are diminished by partial neutralization of the acid and control of the resulting pH to within 4–6.8.

Useful low molecular weight cellulose ethers typically have molecular weights such that a two percent aqueous solution at 20° C. has a viscosity of about 100 cP or less, preferably about 3 to about 100 cP, and most preferably about 3 to about 15 cP in a two percent aqueous solution at 20° C.

Useful cellulose ethers include the following: methylcellulose (MC), hydroxyethylmethylcellulose (HEMC), hydroxypropylmethylcellulose (HPMC), hydroxyethylmethylcellulose (HEMC), ethylhydroxyethylcellulose (EHEC) and hydroxybutylmethylcellulose (HBMC). A particularly useful cellulose ether in making pharmaceutical capsules is hydroxypropylmethylcellulose. Particularly useful cellulose ethers in making food compositions are methylcellulose and hydroxypropylmethylcellulose.

Low molecular weight cellulose ethers are formed by acid-catalyzed depolymerization of high molecular weight cellulose ethers. High molecular weight cellulose ethers typically have viscosities of about 200 centipoise or more in a two percent aqueous solution at 20° C.

Depolymerization is typically carried out by contacting the high molecular weight cellulose ether with a strong acid, preferably anhydrous hydrogen chloride. The acid can be added to the headspace of the reactor or directly into the cellulose ether powder. The headspace of the reactor may be purged with an inert gas to prevent combustion or ignition of the powder.

Following depolymerization, the cellulose ether is contacted with a basic compound, preferably a substantially anhydrous compound such as sodium bicarbonate, with the aim or goal of partially neutralizing the residual acid to retain some degree of acidic content. While the aim of the neutralization step is to partially neutralize rather than substantially or completely neutralize the residual acid, control of the neutralization process, particularly on an industrial scale, is difficult. Some end product batches may be underneutralized or overneutralized. This control problem is discussed below. A preferred method of neutralizing is blowing the compound into the headspace or interior of the depolymerization reactor or other vessel where the depolymerized particulate cellulose ether may be situated. The depolymerization reactor or other vessel is preferably agitated or tumbled during neutralization to ensure uniform contact with the internal surfaces of the reactor.

Targeting a specific end product pH or end product pH within a relatively narrow range, i.e. 4 to 6.8, is difficult as a practical matter. The pH can be impacted demonstrably by relatively small differences in the amount of basic compound used to neutralize acid content. Targeting within still narrower pH ranges is commensurately more difficult. Depending upon the extent of neutralization actually effected, some end product batches may have a pH of less than four. Others may have a pH of 4 to 6.8. Still others may have a pH of greater than 6.8.

In the present invention, pH control is maintained within the desired 4 to 6.8 pH range in the end product by producing two or more discrete product batches of the low molecular weight cellulose ether and subsequently blending them to form a combined product batch having a pH of 4 to 6.8 on a conventional pH logarithmic scale of 0 to 14. At least one of the discrete product batches will have been partially neutralized to a pH of 6.8 or less. Blending of two or more discrete product batches allows pH to be much more accurately targeted and ensures excellent product quality control. Discrete product batches that fall above and below the desired 4 to 6.8 range can be blended to form combined product batches that fall within the desired range or can be blended with discrete product batches that already fall within the desired 4 to 6.8 range to produce combined product batches that still fall within the desired range. Product quality control is best when a relatively large number of discrete product batches are blended. A preferred number of discrete product batches is about 6 or more and a most preferred number is about 10 or more. Discrete product batches can be blended in their entirety or in fractions thereof depending upon the targeted pH or pH range.

Useful teachings relating to the manufacture of high molecular weight and low molecular weight cellulose ethers are seen in the following: U.S. Pat. Nos. 3,391,135; 4,419,510; 4,456,751; 4,477,657; 4,661,589; 5,476,668; and U.S. Ser. No. 09/203,324, filed Dec. 1, 1998. All of the preceding references are incorporated herein by reference.

Cellulose ether capsules are typically manufactured by dipping hot metal pins or bars in a cold, aqueous cellulose ether dip coating solution. The solution thermally gels on the pins and water evaporates during a drying step to form thin film layers of dried cellulose ether around the hot pins. The thin films take the form of caps and bodies, which are then removed from the pins. Caps are mated with bodies to form capsules. Analogous processes exist wherein cold pins are dipped in a hot, aqueous cellulose ether solution. Both processes are within the scope of the present invention Processes for making capsules are seen in U.S. Pat. Nos. 3,617,588; 4,001,211; 4,917,885; and 5,756,036, which are incorporated herein by reference.

The low molecular weight cellulose ethers are useful in pharmaceutical applications other than capsules such as tablet coatings and as excipients for pharmaceutical agents and medicaments in capsules and tablets. Other useful applications include in formulated building products and food compositions. Useful building products and food compositions are seen in Provisional Application Ser. No. 60/141,579, filed Apr. 1, 1999, which is incorporated herein by reference.

EXAMPLES

Examples 1–3

Individual product batches of low molecular weight cellulose ethers were formed by depolymerization of high molecular weight cellulose ethers and blended to form product lots of desired pH and viscosity levels. The pHs and viscosities of the product lots were measured after addition of each consecutive product batch.

Depolymerization was carried out in a batch reactor of one cubic foot (28.3 liters) volume. The entire reactor was placed in an oven so that all surfaces of the reactor were at a uniform temperature. Cellulose ether powder was charged to the reactor and anhydrous hydrogen chloride (HCl) added to the vapor space or headspace of the reactor. The reactor was then tumbled end-over-end for 19–28 minutes to effect partial depolymerization. To partially terminate depolymerization and partially neutralize HCl, an amount of sodium bicarbonate powder was injected into the vapor space or headspace of the reactor with pressurized nitrogen. The reactor was then discharged to form an individual product batch. The process was repeated up to 7 times. Each batch weighed about 16 pounds. The batches were then transferred one-by-one to a ribbon blender for blending to form a product lot. After each batch was added to the blender, viscosity (2 percent aqueous solution at 20° C.) and pH were measured for the combined batches. Viscosity was controlled in the product lot by increasing or decreasing the residence time in the next product batch to be added to the product lot. In similar fashion, the pH of the product lot was controlled by increasing or decreasing the amount of sodium bicarbonate added to the next product batch to be added to the product lot.

The data in the following Table show the efficacy of the present invention in controlling pH and viscosity. Viscosity and pH of individual product batches varied significantly (not shown), but the viscosity and pH of the product lots was effectively controlled by blending the product batches into the product lots. Viscosity was controlled between 4 and 6 centipoise (cP) and pH was controlled between 5.5 and 6.5 in each of the three product lots corresponding to Examples 1–3.

TABLE

| | Example #1 | | Example #2 | | Example #3 | |
|---|---|---|---|---|---|---|
| Batch # | viscosity (cP) | pH | Viscosity (cP) | pH | Viscosity (cP) | pH |
| 1 | — | — | 4.52 | 4.11 | — | — |
| 2 | — | — | 4.25 | 6.11 | 4.25 | 6.24 |
| 3 | 4.89 | 6.52 | 5.79 | 6.86 | 4.6 | 6.24 |
| 4 | 4.97 | 5.96 | 5.62 | 6.31 | 4.57 | 6.08 |
| 5 | 5.04 | 6 | 5.47 | 6.31 | 4.65 | 6.03 |
| 6 | 4.82 | 6.37 | 5.23 | 6.48 | 4.87 | 6.55 |
| 7 | 5.2 | 5.77 | — | — | 4.89 | 6.22 |
| 8 | — | — | — | — | 5.01 | 5.93 |
| 9 | — | — | 5.19 | 6.07 | — | — |

While embodiments of the present capsule and the process for making it have been shown with regard to specific details, it will be appreciated that the present invention may be modified while still being fairly within the scope of the novel teachings and principles set forth herein.

What is claimed is:

1. A process for making a low molecular weight cellulose ether, the process comprising:
   a) providing a high molecular weight cellulose ether of a viscosity of about 200 centipoise or more in a two percent aqueous solution at 20° C.;
   b) contacting the high molecular weight cellulose ether with an amount of an acid sufficient to partially depolymerize it to a low molecular weight cellulose ether of a viscosity of about 100 cP or less at 20° C. in a two percent aqueous solution;

c) partially or substantially neutralizing the acid by contacting the low molecular weight cellulose ether with a basic compound;

d) repeating steps a)–c) to produce two or more discrete product batches of low molecular weight cellulose ether wherein at least one discrete product batch is partially neutralized to a pH of 6.8 or less; and e) blending the two or more discrete product batches to form a combined product batch of low molecular weight cellulose ether of a pH of 4 to 6.8.

2. The process of claim 1, wherein the combined product batch of low molecular weight cellulose ether is dissolved in water to form a dip coating solution, metal pins being dipped into the coating solution, the metal pins being removed from the coating solution, the solution being allowed to thermally gel and subsequently dry on the surface of the pins to form caps and/or bodies, and the caps and/or bodies being removed from the pins.

3. The process of claim 1, wherein the sodium compound is sodium bicarbonate.

4. The process of claim 1, wherein the cellulose ether is a methylcellulose or a hydroxypropylmethylcellulose.

5. The process of claim 1, wherein the number of discrete product batches is about 6 or more.

6. The process of claim 1, wherein the number of discrete product batches is about 10 or more.

* * * * *